Patented June 16, 1942

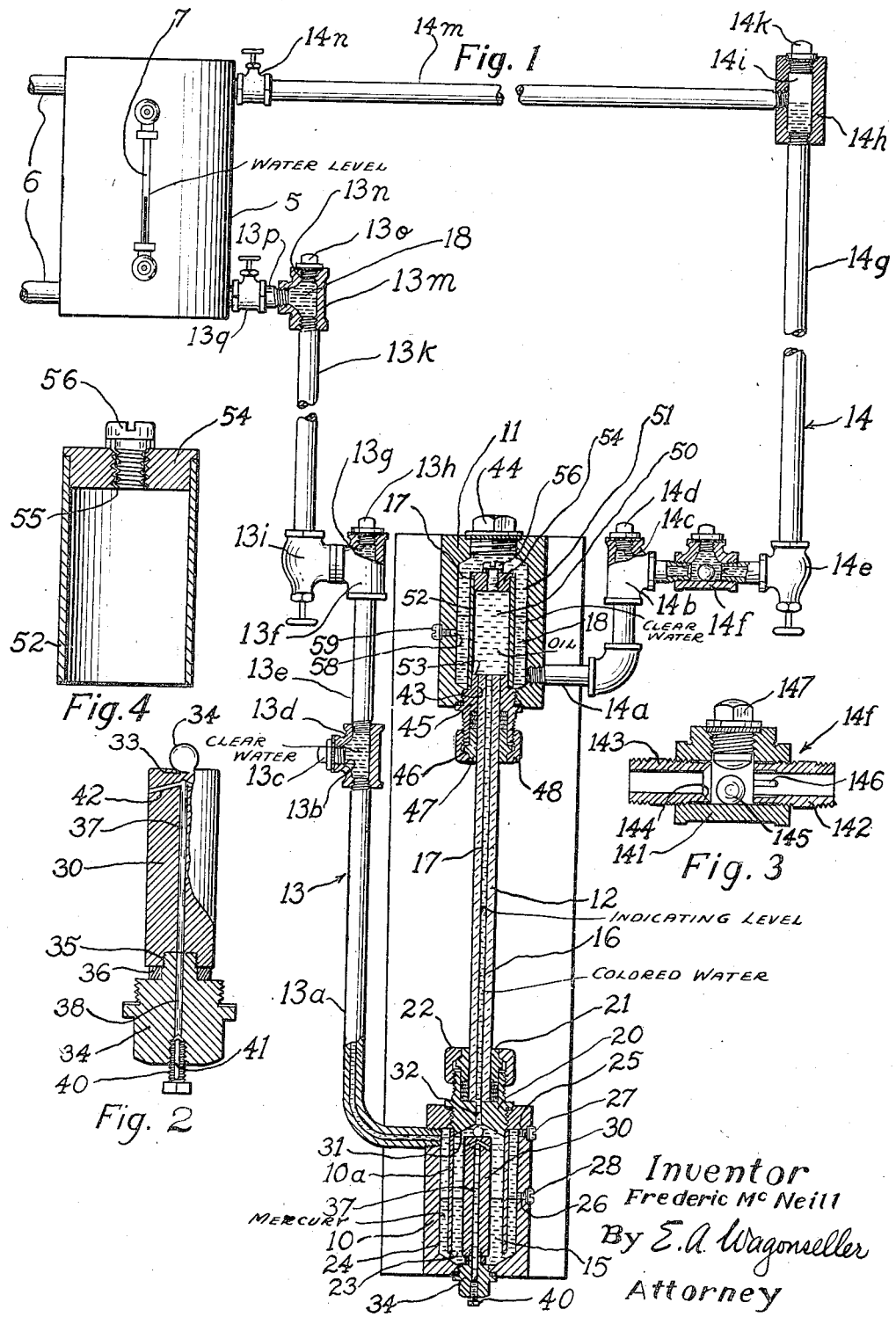

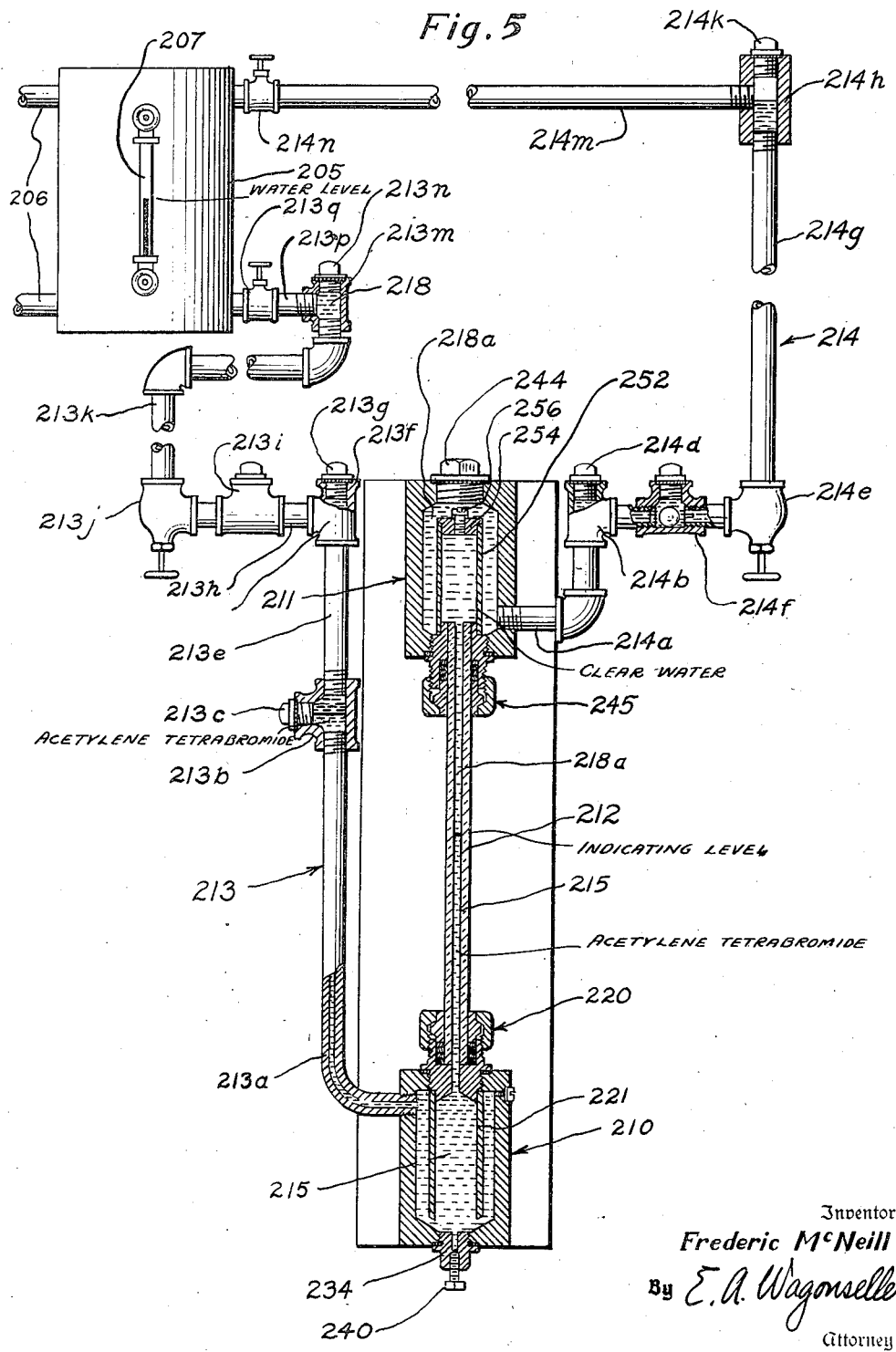

2,286,919

UNITED STATES PATENT OFFICE 2,286,919

LIQUID LEVEL INDICATOR

Frederic McNeill, Chicago, Ill., assignor to T. W. McNeill Engineering Equipment Co., Chicago, Ill.

Application February 14, 1938, Serial No. 190,476

21 Claims. (Cl. 73—299)

The present invention relates to liquid level indicators and more particularly to liquid level indicators adapted to indicate the water level in boilers or the like at a point remote from the boiler.

The invention herein disclosed is in the nature of an improvement in the Liquid level indicator disclosed in my prior Patent No. 1,699,075.

One object of the invention is to generally improve liquid level indicators of the type described.

Another object is to provide an indicator of this type which is especially adapted for floating vessels which, at times, tend to assume positions other than horizontal. The present indicator is so constructed as to minimize the degree of error of indication under such conditions.

Another object of the invention is to simplify the installation of indicators of this type and to provide for an improved arrangement whereby the indicating means may be readily calibrated to insure accuracy of indication.

Another object of the invention is to provide for a retarding or damping of the operation of indicating means so that the indicator will not be unduly influenced in sudden changes in level of the boiler or other receptacle the level of liquid in which is to be indicated.

Other and further important objects of the invention will become apparent from the disclosure of the specification and the accompanying drawings.

In the drawings:

Fig. 1 is a schematic elevational view, partly in section, of a liquid level indicator made in accordance with one form of the invention;

Fig. 2 is an enlarged detail view of a portion of the device for properly proportioning the volume of the calibrating chamber;

Fig. 3 is a sectional detail view of one form of check valve used with the device of the present invention;

Fig. 4 is a sectional detail view of a portion of a control chamber arranged to provide for retarding the indication of sudden changes in level of the liquid to be indicated; and Fig. 5 is an elevational view, partly in section, of a modified form of liquid level indicator.

The liquid level indicator, as herein disclosed, comprises an indicating element such as a glass tube containing two contrasting colored nonmiscible liquids, the line between the liquids being sharply defined and constituting the indicating line or level. The level of the indicating liquid is determined by the difference between the heads of liquid in a constant head column and a variable head column contained in two conduits connected respectively to the boiler or similar reservoir at points beyond normal minimum and maximum levels.

Referring particularly to the embodiment of the invention disclosed in Figs. 1 to 4, inclusive, the liquid level indicator is illustrated as being connected to a container to be measured, such as a standard water column 5 of a boiler, by means of pipes 6, 6. Mounted on the water column 5 is a standard water glass 7.

While, for simplicity of description, the device of the present invention has been described herein as pertaining to boilers, it is desired that the term "boilers" be considered as being used in a generic sense, as the present invention is applicable to any art wherein it is desired to indicate at a distance the height of liquid in a liquid containing reservoir. It is also desired that reference to water be considered as used in a generic sense as meaning the liquid to be measured.

The indicating device comprises a lower trap chamber casing 10 and an upper trap chamber casing 11 between which extends a transparent indicating tube 12 of glass or the like. The lower casing 10 is connected to the lower end of the water column 5 by a conduit 13 containing the variable head column and the upper casing 11 is connected to the upper end of the water column 5 by a conduit 14 containing the constant head column.

The lower trap chamber casing is arranged so that a column of heavy liquid 15, such as mercury, supports the variable head column contained in conduit 13 on one side and on the other side supports a column of distinctively hued liquid 16, being, in the present instance, colored water, located in the tube 12. Above the colored liquid is supported a column of a liquid 17 not miscible with the colored liquid, being oil in the present instance. Above the column of oil 17 is supported a column of water 18, assuming that water is the liquid to be measured. It is to be understood that, while the use of colored water is satisfactory, any expedient for obtaining a contrast in the two contacting liquids in the indicating tube may be employed.

The amounts of oil 17, colored water 16, and mercury 15 in the indicating device are so related to the opposed heads of water columns in conduit 13 and conduit 14 that a lowering of the head in conduit 13 will cause a proportionate lowering of the level of the upper portion of the colored water column 16. By properly adjusting the capacity in the compartments in the interior of trap chamber casing 10 the indication in the glass tube 12 may be made closely correspondent or proportionate to the changes in level of the water in the boiler.

A preferred construction of the lower trap chamber casing 10 will now be described. This casing is preferably tubular in form and is provided at the top with a plug 20 threaded into the top of the casing 10. This plug is hollowed out to receive a packing member 21 which surrounds the lower end of glass tube 12. A packing nut 22 is provided to insure a tight joint between the tube 12 and casing 10.

The casing 10 is preferably divided into primary and secondary compartments 23 and 24 by means of a partition member 10a, preferably of tubular form. These compartments communicate with each other at the lower end of the casing and constitute in effect a U-shaped compartment or tube in which the legs are circular in shape and disposed in concentric relation. The conduit 13 is connected to the casing 10 near its upper end and communicates directly with the secondary or outer compartment. For this purpose, pipe 13a, forming part of conduit 13, is threaded into the casing 10.

The trap chamber casing 10 is also provided with filling openings 25 and 26 adapted to be closed by packed plugs 27 and 28. The purpose of the opening 26 is to provide for controlling the introduction of a suitable quantity of mercury into the compartments 23 and 24; and the purpose of opening 25 is to enable the outer compartment 24 to be completely filled with liquid from the conduit 13. In this connection it is to be noted that the opening 25 is formed adjacent the upper end of compartment 24.

Means are preferably provided for fixing or proportioning the volumes of the primary and secondary compartments of casing 10. In the present instance this volume fixing means is located within the primary or inner compartment 23 and is preferably in the form of a pin-like element or cylinder 30 which may be termed a displacement or calibrating member.

It is apparent that the larger the diameter of the calibrating member 30, the smaller volume there will be left in the inner or primary compartment 23 so that a proper selection of size of the calibrating member 30 is necessary to effect a control of the upward displacement of colored liquid in the indicating tube in accordance with the changes in level of water in the boiler. The construction must be such that when the high specific gravity liquid flows from, say, the outer compartment into the inner compartment, the volume of liquid entering the inner compartment will be controlled so that when an equal volume of superposed liquid is displaced into the indicating glass the upper surface of such liquid will properly indicate the level of water in the boiler. In practice, there will be required a particular size of calibrating member 30 for each indicating glass due to the fact that there is some slight degree of variation in the bore of indicating glasses obtainable upon the market. Thus, by accurately measuring the interior dimension of the indicating glass used in each instance, it is possible to determine what degree in variation in size of the calibrating member is necessary. This problem is a practical one and is referred to herein for the sake of completeness of the description.

Another factor determining the size of the calibrating member 30 is the normal difference in temperature existing between the water columns in conduits 13 and 14. If the upper part of the water column in the conduit 13 contains water under high steam pressure and consequently a relatively high temperature, it will be seen that this portion of the water column, including the water in the boiler up to the level of the water therein, will be of less specific gravity than the equivalent portion of water in conduit 14. Thus an increase in height of the water in the boiler, where such water is at a high temperature, will not cause so much displacement of the heavy liquid from the secondary to the primary compartment as would be the case if the water was cooler. Accordingly, the cross-sectional area of the member 30 must be determined so as to compensate for this difference in specific gravity between the water contained in the two conduits.

To explain this in more detail, if the water in the boiler is considered as having a specific gravity of 1.00, it is obvious that the addition of one inch of water to the boiler would cause the indicating fluid in the glass to move upward one inch under proper proportioning of the inner and outer compartments and indicating glass. Now, assuming that the water in the boiler is subject to steam pressure under normal boiler operation, the specific gravity of the water in the boiler will be less than 1.00 and an increase of one inch of water in the boiler will not displace so much high specific gravity liquid from the outer compartment to the inner compartment as in the previous example. Accordingly, in order to assure the proper upward displacement of the indicating liquid in the glass, the inner compartment must be made larger with relation to the outer compartment and in order to obtain this relationship a smaller calibrating member 30 must be selected. The size of this member will therefore depend upon the temperature at which a particular boiler is to be operated.

Means are provided for preventing the escape of mercury or other heavy liquid from the inner compartment 23 in the event of breakage of the tube 12. For this purpose the plug 20 is formed with a concave under surface 31 leading into the opening 32 which communicates with the interior of the tube 12. The upper surface of the calibrating member 30 (see Fig. 2) is hollowed out at 33 to receive a valve member 34, preferably in the form of a metal ball capable of floating in the heavy liquid employed but not in the liquid thereabove. In the event the glass tube 12 should break, the ball 34 will remain in its seat 33 until the heavy liquid rises into contact with the ball whereupon the ball will be caused to rise with the upper surface of the heavy liquid and come to rest at the lower end of opening 32 in the plug 20, thus preventing the heavy liquid from passing out of the primary compartment.

The calibrating member 30 is preferably held in place within the casing 10 by means of a plug 34, threaded centrally into the bottom wall of the casing 10. This plug 34 is provided with a threaded portion 35 on to which the threaded lower end of the member 30 may be secured. A gasket 36 of rubber or other suitable material may be disposed between the lower end of the member 30 and plug 34.

Means are preferably provided for withdrawing a desired quantity of colored fluid 16 from the upper part of the compartment 23 without disturbing the body of mercury therein. For this purpose the calibrating member 30 is provided with a duct 37 having an opening adjacent the upper end of the member and at the lower end thereof communicating with an opening 38 formed in the plug 34. The lower end of the opening 38 is suitably closed, as by means of a metal valve plug 40. This valve plug has a slot 41 formed therein through the length of its thread so that when open it will permit the passage of liquid through the conduits 37 and 38.

In order to prevent the mercury from passing into the conduit 37, should the mercury rise to a point near the upper end of the member 30, the upper end of conduit 37 terminates in downwardly inclined channels 42, 42. Thus, before the mercury can begin to enter the conduit 37 it has completely closed branch conduits 42, 42 and the liquid trapped within the conduit 37 will prevent movement of mercury into it.

The preferred construction of the upper trap chamber casing 11 will next be described. This casing is provided with a screw-threaded plug 44 disposed centrally in the top of the casing. The lower end of casing 11 has a threaded opening into which plug 45 is threaded. This plug is provided with an opening 46 to receive a packing element 47 held in place by a packing nut 48 threaded exteriorly upon the lower end of plug 45. The plug 45 is provided with a central opening to accommodate the tube 12.

The interior of casing 11 is preferably divided into inner and outer compartments 50 and 51. For this purpose a partition member 52, preferably of tubular form is disposed within the casing 11 and held in place by fitting it on an extension 53 formed on the plug 45.

The upper end of the partition member or casing 52 is fitted with a plug 54 provided with a centrally threaded opening 55 (see Fig. 4) into which a retarding element in the form of a screw 56 may be disposed. The threads in the plug 54 are formed of a different contour or depth from the threads on the retarding element or screw 56 whereby an opening will be formed from the exterior to the interior of the inner casing 52 around the threads. This opening is small and tends to resist the free passage of fluid such as light oil between the interior and exterior of casing 52.

As will be more fully pointed out in the following description the opening through the plug 54 tends to retard movement of liquid between inner and outer casings 50 and 51 and prevents undue fluctuation of the indicating column, which would otherwise be likely to occur in a case where the boiler in which the liquid level was to be indicated was located on an ocean going vessel.

The lower end of casing 11 has a threaded opening therein to receive a pipe 14a constituting the lower end of the conduit 14.

An opening 58 is provided, preferably about midway between top and bottom of the casing 11, to facilitate installation of the indicating device as will be later more fully pointed out. This opening is provided with a suitable closure, herein shown as plug 59.

The conduit 13 preferably extends from the lower end of water column 5 to the upper end of trap chamber casing 10. As previously mentioned, the pipe 13a is joined to the casing 10. At the upper end of pipe 13a substantially in horizontal alignment with the point of maximum indication of the indicating fluid in glass 12 an opening 13b is provided. This opening is closed by a plug 13c. For convenience the opening 13b is provided by using an ordinary pipe T 13d.

The T 13d is preferably joined by a length of pipe 13e to another T 13f having an opening 13g closed by a plug 13h. A valve 13i is provided adjacent the T 13f. A pipe 13k connects the valve 13i with another T 13m having an opening 13n closed by a plug 13o. The other opening of the T 13m is connected to the water column 5 by means of pipe 13p controlled by a valve 13q.

The conduit 14 preferably extends from the lower part of trap chamber casing 11 to the upper part of water column 5. Conduit 14 comprises a pipe 14a joined to a fitting 14b having an opening 14c closed by a plug 14d. A valve 14e is provided approximately on the same level with the fitting 14b and between the valve and fitting 14b is located a check valve 14f. See Fig. 3. This check valve will be later referred to more in detail. A pipe 14g leads from valve 14e to a chamber 14h which may be termed a capacity chamber. At the top of this chamber is provided a filling opening 14i arranged to be closed by a plug 14k. A pipe 14m extends between chamber 14h to the upper part of water column 5 and has a valve 14n located at the end thereof adjacent the water column.

As shown in Fig. 3, the check valve 14f is preferably of the horizontal type and comprises a main casing 141 of tubular form having pipes 142 and 143 fitted in the ends thereof. The pipe 143 at its inner end is formed with a concave mouth 144 adapted to be closed by a ball 145. In order for the ball to close the opening it must be forced up the inclined surface of the concave opening 144. The pipe 142 is provided at its inner end with notches or openings 146 formed longitudinally thereof so that the flow of liquid toward the right, as view in Fig. 3, will not be prevented.

A plug 147 is threaded into an opening at the top of casing 141 so as to permit ready replacement of the ball 145.

The installation and operation of the liquid level indicating device will now be described.

After the liquid level indicating device has been installed in connection with a boiler and the parts assembled substantially as indicated in Fig. 1, the device in then ready to receive the various liquids to be used therein. A convenient procedure is to first close valves 14n and 13q, as well as the valves 13i and 14e. Plugs 14k and 13o are then removed and the pipes 13k and 14g of the conduits 13 and 14 are then filled to overflowing with water or whatever liquid is in the boiler or other container being measured.

It is to be noted that the water introduced into pipe 14g will remain in the upper part of the conduit 14 only as high as will be permitted by pipe 14m and valve 14n. Thus, if the liquid to be measured is water in a boiler under steam pressure, it is apparent that the steam will pass out through valve 14n, when open, and through pipe 14m and will condense in this pipe and in the capacity chamber 14h. The condensation will maintain the liquid in the chamber 14h at a constant level as any excess will constantly flow back through pipe 14m to the water column 5.

When the pipes 14g and 13k are filled, as described, the plugs 14k and 13o will then be replaced and valves 14n and 13q will be opened so that water in the water column 5 will flow out to join the water in the T 13m and so that the excess liquid in the chamber 14h may drain into the water column 5. At this point it is to be observed that the head in the pipes 13k and 14g is the same as it would normally be with no water in the water column 5.

In order to continue to fill the indicating device, plugs 13h and 13c in conduit 13 are removed and plug 14d in conduit 14 is removed; the plugs 44 and 59 and retarding screw 56 in the upper casing 11 are removed and plugs 27 and 28 in the lower casing 10 are removed. The plug 34 will be left in place and the needle valve 40 is maintained closed. Mercury is then preferably introduced into the lower casing 10 by pouring it through the opening, normally closed by plug 44, and through the opening normally partially closed by retarding screw 56 in the inner casing 52. The mercury passes down through the indicating glass 12 and into the inner chamber 23 of the lower casing 10, thence rising in the outer chamber 24. Since the displaced air passes out through openings, such as openings 25 and 26, the two columns of mercury will rise equally. Pouring of mercury continues until it begins to run out the opening 26. At this point no more mercury will be introduced and the plug 28 will be replaced to close opening 26.

Water is then poured in through opening 13g until it overflows at opening 25 in the casing 10. Plug 27 is then replaced in such opening and the filling of conduit 13 continues until water overflows at opening 13b, which, as previously explained, is equal to the height of the maximum indication in glass 12. Needle valve 40 is then opened and colored indicating fluid is poured in through the opening normally closed by plug 44 and through the opening normally partially closed by retarding screw 56 until it overflows at the needle valve by passing into the passages 42 and 37. The needle valve is then closed and additional colored fluid is added until the level of the fluid is just even with the bottom surface of the packing nut 48 connected with the casing 11. In other words, the liquid is poured in until the point of maximum indication is reached. At this point plug 13c is replaced in opening 13b. Water is then poured in through opening 14c until it overflows at opening 58, whereupon plug 59 is replaced to close this opening.

The next step is to introduce oil into the inner chamber 50 including the top portion of the indicating glass 12 and that portion of the outer chamber 51 not filled with water. When the oil is filled to the opening closed by plug 44, both the retarding screw 56 and the plug 44 are replaced. The oil used is preferably a fluent, transparent oil, such as kerosene.

After the oil has been introduced, water will be poured in through opening 13g and 14c in conduits 13 and 14 until the water overflows at these points, whereupon plugs 13h and 14d will be replaced. It is to be noted that the conduits 13 and 14, as well as the upper and lower casings 10 and 11 are now completely filled with liquid, no air or other gas being present except in the upper part of chamber 14h and pipe 14m and possibly in conduit 37 in trap chamber casing 10.

Valves 13i and 14e are then opened and, if the water column 5 is empty, or at minimum level, the colored fluid in the indicating glass 12 will recede to substantially the point of zero indication. The reason it does not go entirely to the zero point is due to the fact that the foregoing method of filling causes a greater amount of indicating fluid to be put in than that required to compensate for the difference in the length of the connecting pipes 13k and 14g. Assuming that the water in water column 5 is at the minimum level, the excess indicating fluid is then drained out through the needle valve 40 to the point of zero indication. If the water column is partly full it will only be necessary to drain out excess colored fluid to a point where the indication in glass 12 gives the same indication as that in glass 7 on the water column. During the operation of drawing off the excess colored fluid any air trapped in conduit 37 will escape.

During the operation of this form of the invention any change in level of the water in the boiler will create a greater or less difference in head between the water in conduits 13 and 14. The constant head conduit will remain constant in the present instance by reason of condensation occurring in pipe 14m which keeps the surface of the liquid in chamber 14h at substantially a constant level. In the event that the body of liquid in conduit 14 should rise it is apparent that the excess will flow back along the pipe 14m to the water column 5.

Assuming, for example, that the boiler is operating under steam pressure, it is to be observed that an equal pressure will be imposed on the upper surface of each column of liquid in conduits 13 and 14. Accordingly, the difference in head between the two columns of liquid will be the only variable factor tending to change the level of indicating fluid in the tube 12. As the surface of the water in the boiler gets lower the level of indicating fluid in the tube 12 will sink proportionately. The reason for this is, as previously stated, that the mercury in the lower part of the trap chamber 10 will begin to flow from the inner compartment 23 to the outer compartment 24 so that the difference in head between the two columns of mercury will just balance the difference in head of the water columns. Due to the manner of determining the relative sizes of the inner and outer compartments of the trap chamber, the indicating fluid will move downward substantially exactly in accordance with the downward movement of the water in the water column 5, as indicated by gauge glass 7. When the water in the boiler is replenished just the opposite action occurs as will be readily understood.

Due to the provision of the retarding element 56 in the upper trap chamber the displacement of liquid between the inner and outer compartments 50 and 51 will be retarded. Thus when the device of the present invention is used on ships and other mobile structures, subject at times to quick periodic changes in level or angular position with reference to the horizontal, there will be no sudden change in the level of the indicating liquid and the tendency will be to cause the indicator to remain substantially constant.

In the event of breakage of the indicating tube 12 when the boiler is operating under pressure the check valve 14f will immediately close due to the pressure in the conduit 14. At the same time the pressure in conduit 13 will cause the metal ball in lower trap chamber 10 to rise and close the lower end of the duct 32. The usual result on breaking of the tube 12 is an instantaneous closing of both conduits with a loss of only a very small amount of liquid.

If the tube 12 should break with no pressure in the boiler the check valve 14f will close as soon as the water in conduit 14 begins to move with appreciable speed. The water in the upper part of the trap chamber 10 would begin to flow out and this would continue until the metal ball 34 was floated by the mercury into position to close the duct 32, after which the flow would stop and no mercury would be lost.

In the event of a slow leak occurring in either conduit 13 or conduit 14 the mercury column will rise either in the tube 12 or in the lower part of the conduit 13, depending upon the point of leakage, and this rising movement will continue until the weight of the mercury, as for example, in the tube 12, together with such amount of liquid as shall remain thereabove, will balance the weight of the column of water and mercury located in the lower end of conduit 13 and the lower end of the trap chamber 10.

The lengths of the inner compartment 23 and the outer compartment 24 and the cross sectional areas thereof, considered with the cross sectional area of the tube 12, are preferably such that a column of mercury in the inner compartment 23 and the tube 12 will balance the remaining mercury in the outer compartment 24 and the water in the conduit 13 before all of the mercury is expelled from the outer compartment. In other words the parts are so related that before the water in conduit 13 will pass down into the compartment 24 and thence into the compartment 23 which would cause the water to begin to flow up through the body of mercury, the body of mercury in the inner compartment 23 and the tube 12 together with the liquid above the mercury will balance the weight of liquid including both mercury and water in the compartment 24 and the conduit 13.

The above mentioned relationship is also useful if for some reason the conduit 14 is not properly filled with water at the beginning of the operation of the device.

If a slow leak occurs in the conduit 13 the reverse operation ensues, namely, the mercury will begin to rise in the conduit 13 and will continue rising until the column of mercury in the conduit 13 will balance the weight of the water in conduit 14 and in the lower end of the inner compartment 23 and this balancing result will occur before the mercury will become entirely displaced from the inner compartment 23.

In referring to the operation of the device due to a leakage in conduit 13 or conduit 14 it may be assumed that the metal ball in the upper part of trap chamber 10 is either not present or is not operative to completely close the lower end of the duct 32.

The lengths and the cross sectional areas of the upper trap chamber compartments 50 and 51 are so related to the cross-sectional area of the tube 12 that when a leak occurs in conduit 13, causing the mercury to rise in this conduit and lower in the tube 12 with a consequent lowering of the body of the oil in tube 12 and inner compartment 50, and causing the water to rise in the outer compartment 51, the movement of the column of mercury will stop before the oil has completely flowed from the outer compartment 51, which would tend to permit water from conduit 14 to flow into the inner compartment. If a leak should occur in the upper part of conduit 14 the mercury, as previously indicated, will rise in tube 12 until the column of mercury in this tube will balance the weight of the water as above described in conduit 13. Since the upward movement of the mercury column will cease before the lower end of the column passes beyond the outer compartment 24 and into the inner compartment 23, the flow of oil will accordingly also cease before the oil has passed from the outer compartment 51 of the upper trap chamber into the conduit 14. From the above it is apparent that no oil will become lost from the trap chamber due to leakage in conduits 13 or 14.

It is also to be noted that the colored liquid 16 during any extreme fluctuation in the body of the mercury in the lower trap chamber and the body of oil in the upper trap chamber, will remain either in the inner compartment 23 of the lower trap chamber, as for example, when the column of mercury is moving into the conduit 13; or the colored fluid 16 will be retained entirely in the tube 12 and in the inner compartment 50 of the upper trap chamber, as for example, when the mercury is moving up into the tube 12 in order to balance the column of water in the conduit 13.

It is to be further noted from the foregoing that the various liquids, namely the mercury, colored fluid, and the oil contained respectively in the lower trap chamber, in the tube 12, and the upper trap chamber will always be maintained in their original relative positions during normal operation of the device as well as during certain abnormal operations, such as leakages occurring in the conduit 13 and conduit 14.

It is also to be noted that any foreign matter such as scale or other sediment that may be carried over into the conduit 14 will be retained in the lower end of the upper trap chamber and thereby prevented from reaching the liquid in the tube where it would interfere with the indicating function of the tube.

When it is desired to install a new tube 12 to replace a broken one the valves 13i and 14e are closed to cut off pressure to the indicating device. The broken parts are removed after which plugs 44 and 54 are removed and packing elements 22 and 48 suitably removed or loosened. A new glass can then be inserted downwardly through the upper trap chamber until it assumes the position indicated in Fig. 1. The upper and lower packing elements will then be tightened whereupon the device is ready for recharging with the necessary liquids by repeating part of the steps outlined above. After the liquids have been introduced the plugs 54 and 44 are replaced and the device is then ready for continued operation.

The modified form of the invention, illustrated in Fig. 5, will now be described. In this form of the invention the indication is given by the same liquid that is used to balance the difference between the heads of water in the variable head column and the constant head column. In this form the water column indicated at 205, is connected to a boiler or other receptacle by pipes 206, 206 and carries an indicating glass 207.

The indicating device, as disclosed in this modified form of the invention, comprises a lower trap chamber casing 210 and an upper trap chamber casing 211 between which extends the transparent indicating tube 212 of material, such as glass. The lower casing 210 is connected to the lower end of the water column 205 by a conduit 213 and the upper casing 211 is connected to the upper end of water column 205 by a conduit 214.

The lower trap chamber casing is arranged so that a column 215 of liquid of high specific gravity, preferably a liquid of the type of acetylene tetrabromide, fills same and extends upwardly into both the tube 212 and the conduit 213. The high specific gravity liquid employed is nonmiscible with the water or other liquid to be measured and is preferably readily adapted to be permanently colored so as to be clearly distinguishable from the liquid to be measured.

The water 218, or other liquid to be measured, fills the conduits 213 and 214 and is in contact with both branches or columns of the high specific gravity liquid.

The amount of high specific gravity liquid 215 is so related to the opposed heads of water columns in the conduits 213 and 214 that a lowering of the head in conduit 213 will cause a proportionate lowering of the level of the upper surface of the liquid 215 in the glass 212. By properly adjusting or altering the specific gravity of the liquid 215 it is possible to obtain an indication in the glass 212 which will change in a substantially identical manner with the changes of water level in the boiler.

The lower trap chamber 210 may be formed in a manner generally similar to the trap chamber 10 of the form of invention first described. This casing is preferably tubular and is provided at the top with suitably connecting fittings, indicated generally at 220, enabling the glass 212 to be connected to the casing 210 in a liquid tight manner.

An inner casing member or partition 221, in the form of an open ended tube, is secured at the top of the casing 210 and has its lower end disposed adjacent to but spaced from the lower wall of this casing. A plug 234 is arranged to close a drainage opening in the lower wall of the casing 210. This plug 234 is preferably provided with a needle valve member 240 to enable selected quantities of the liquid 215 to be withdrawn. The same general form of lower trap chamber casing may be used in this form of the invention as in the first described form except that the equivalent of the calibrating member 30 may be dispensed with.

The conduit 213 is suitably connected to the trap chamber 210, preferably, as indicated, at a point near the top of the casing. This conduit comprises a section of pipe 213a connected at the point just mentioned and extending upward to a height approximately equal to that of the point of maximum indication in the glass 212. At its upper end the pipe 213a is connected with a fitting in the form of a closed reservoir 213b having a horizontal cross-sectional area substantially greater than the corresponding area of the pipe 213a. This reservoir has an opening closed by a plug 213c.

A pipe 213e extends upwardly from reservoir 213b, and is connected with a fitting 213f having a filling opening therein closed by a plug 213g. A pipe 213h connects fitting 213f with a check valve 213i which in turn is connected to a valve 213j. This valve is connected through pipe 213k to a fitting 213m provided with a plug 213n. Fitting 213m is connected by pipe 213p to a valve 213q connected to the water column 205 at its lower end.

Check valve 213i is similar to check valve 14f of the form first described and is arranged to stop the flow of water or steam through conduit 213 toward the glass 212 in the event the latter should become broken.

The upper trap chamber casing 211, as in the case of casing 210, may be formed generally similar to the upper trap chamber casing 11 in the first described form of the invention. This casing 211 is preferably tubular and is provided with a screw-threaded plug 244 closing an opening in the top wall of the casing. The bottom of casing 211 is provided with suitable fittings, indicated generally at 245, enabling the glass 212 to be connected to the casing 211 in a liquid tight manner.

An inner casing or partition 252, in the form of an open ended tube, is secured at the lower end of casing 211 and has its upper end disposed adjacent but spaced from the upper end of the casing.

The upper end of the partition member or casing 252 is fitted with a plug 254 provided with a centrally threaded opening into which a threaded closure member 256 may be disposed. The threads in the plug 254, as in the first form of the invention, are formed of a different contour or depth from the threads on the closure member 256 whereby an opening will be formed from the exterior to the interior of the inner casing 252 around the threads. This opening is small and tends to resist the free passage of fluid between the interior and exterior of casing 252.

A pipe 214a, constituting the lower end of conduit 214, is preferably connected to the lower end of the casing 211. This pipe extends upward and terminates in a fitting 214b, having a filling opening closed by a plug 214d. A valve 214e is provided approximately on the same level with the fitting 214d and between the valve and fitting is located a check valve 214f. This check valve is similar to check valve 14f of the form first described. A pipe 214g leads from valve 214e to a chamber 214h which may be termed a capacity chamber. At the top of this chamber is provided a filling opening arranged to be closed by a plug 214k. A pipe 214m extends between chamber 214h to the upper part of water column 205 and has a valve 214n located at the end thereof adjacent the water column.

The installation and operation of the device constituting this modified form of the invention will now be described.

With the system connected, as shown, the valves 213j, 213q, 214e and 214n will be closed and plugs 213c, 213g, 213n, 214d, 214k and 244 and retarding screw 256 removed from the openings which they close. High specific gravity liquid, such as acetylene tetrabromide, will then be poured in at the opening closed by plug 244 until the casing 210 has become filled, as well as tube 212, to the point of maximum indication. At this point the liquid will start to flow out of the opening in casing 213b, and this casing will then preferably be about half full.

Plug 213c will then be replaced whereupon clear water, or if desired, distilled water 218a is poured into the opening in fitting 214d to fill the inner and outer compartment of the upper trap chamber 211 and also to fill the fitting 214d, and the valve 214f up to the valve 214e which is maintained closed during this portion of the filling. Ordinarily boiler water is then poured in the opening of the fitting 213f until it overflows at the opening whereupon the plug 213g and the plug 214d are replaced. The retarding screw 256 and plug 244 will also then be replaced, whereupon water is poured into plug openings 213n and 214k until it overflows into pipe 214m out of the casing of fitting 214h and out of the casing 213m into pipe 213p. During this operation valves 213q and 214n are retained closed. The plugs 213n and 214k are then replaced. The valves 213q and 214n are then opened and the indicating device is then ready for operation.

Upon opening valve 214n, any excess water in the conduit 214 will flow back along the pipe 214n and will run into the water column 205, the normal level of liquid remaining in the conduit 214 may be conveniently referred to as the constant head level or the level of the constant head column.

Steam passing out along pipe 214m will condense and maintain the water in column 214 at a constant level. If the level of water in the water column 205 is at maximum the top of the column of high specific gravity liquid 215 will remain at its maximum indication. As the water in the water column 205 recedes, due to lowering of the level in the boiler, the level of liquid 215 in the glass 212 will recede so that the difference in head of the two opposed columns of liquid 215 will just equal the difference in head between the two water columns.

The manner of obtaining movement of the liquid 215 in the indicating glass 212 substantially exactly with the changes in water level in the water column 205 will now be described. For this purpose the specific gravity of the water in the boiler is determined. In this connection, it may be stated that different boilers may be adapted to operate at different pressures and temperatures, hence there will be a difference in the specific gravity of boiler water between one boiler and another. In order to adapt the device to a particular boiler the specific gravity of the liquid 215 will be altered by the addition of some readily miscible fluid which also has the property of being nonmiscible with water. Thus, when acetylene tetrabromide is used as the high specific gravity liquid, its specific gravity may be varied by the addition of oil, or other suitable lighter liquid.

If, for example, it is desired to indicate variations of level of water in the boiler the temperature of which would cause the water in the boiler and in the upper part of the constant head liquid column to have a specific gravity of .80, and assuming that the total variation to be measured was ten inches, the variable and constant head columns would be connected to the water column 205 at a distance of ten inches between centers, that is, the distance would be measured between the centers of pipes 213p and 214m.

As the indicating panel will ordinarily be placed at a point remote from the boiler where the temperature is substantially that of ordinary room temperature, the water in the water columns adjacent the indicating apparatus can be considered as having a specific gravity of substantially 1.00. The water at the top of the constant head column, being in direct contact with steam from the boiler, will have a temperature generally corresponding with that of the steam and a limited portion of the upper part of the constant head column will therefore contain water which is of a lower specific gravity. The same thing is true with regard to the variable head column up to the point where this column joins with the water column 205 of the boiler. The temperature of the water will gradually decrease for points more and more remote from the upper ends of both conduits until the temperature reaches substantially that of ordinary room temperature. As substantially the same comparative condition exists in each conduit, the respective heads of water in each of the conduits will balance out against each other so that, for practical purposes, it is only necessary to deal with that portion of the body of water in the boiler above the point of minimum level to be measured, that is, above the upper end of the conduit 13.

As, in the example above given, the specific gravity of the liquid to be measured is .80 it is apparent that a difference of 10 inches in level of the water in the boiler will be equivalent to only an 8 inch difference in head of water at specific gravity of 1.00. The high specific gravity liquid in the gauge must then have its specific gravity so altered as to cause its upper level in the indicating tube to move one inch for every inch of change in level of the water in the boiler. In order to determine the proper specific gravity of the high specific gravity liquid, let it be assumed, for the moment, that the horizontal cross-sectional area of the casing 213b is infinitely large. Under such a condition the level of the high specific gravity liquid 215 in this casing would not change with fluctuation in the boiler level and all of the change would occur in the surface of the liquid 215 in the tube 212. Under such a condition the specific gravity of the liquid 215 must be fixed at 1.80, the specific gravity being changed by mixing it with oil, or other suitable lighter liquid, as explained above. Thus it is apparent that a difference of ten inches between the level of the constant head conduit and the level of the variable conduit will equal a head of eight inches of water (of specific gravity of 1.00) assuming, as above, that the water being measured has a specific gravity of .80. Thus the difference in head between that portion of the water in the tube 212 extending from the upper surface of liquid 215 to the point of maximum indication on the one hand, and the portion of liquid 215 in conduit 213 between these same levels is 8, thus, balancing the head difference of 8 between the upper ends of the variable head and constant head conduits.

Since the casing 213b does not have an infinite area there will be a slight change in level of the liquid 215 in this casing as the level of water changes in the boiler. The specific gravity of the liquid 215 must therefore be altered so as to compensate for the slight rise and fall of level in the casing 213b. In other words, the specific gravity of the liquid 215 must be slightly less than 1.80. For example, if the cross-sectional areas of the tube 212 and casing 213b, are in the ration of 1 to 10, the level of liquid 215 in casing 213b would change 1 inch for 10 inches of change in the level of liquid in tube 212. The difference in height between the two opposed surfaces of liquid 215 in the tube 212 and conduit 213 would be 11 inches. Thus, a head difference in the two conduits equal to 8 would have to be translated into 11 inches of movement between the upper surfaces of liquid 215. In practice, the relationship of the parts would produce a change in level of liquid in casing 213b of approximately $\tfrac{1}{16}$ inch with ten inches of movement of the liquid 215 in tube 212.

The formula for determining the proper specific gravity of the liquid 215 may be developed as follows. Let X represent the specific gravity of the heavy liquid. Let $L^1$ represent the difference in height between the two columns of high specific gravity liquid. Then, since the head may be computed by multiplying the height of the liquid by its specific gravity, the head of column $L^1$ may be represented as $L^1X$. Let $W^1$ represent the head of liquid to be measured, that is the liquid in conduit 214 which is above the level of liquid in conduit 213. Then let $W^2$ represent the head of the liquid in the indicating glass just above the top of the liquid 215. The length of this column of liquid will equal the length of the column $L^1$ in the conduit 213. The formula may thus be written—

$$L^1X = W^1 + W^2$$

As assumed above, the length of $L^1$ is 11 inches; the length of the head of water $W^2$ must also be 11 inches; and the length of the head of water $W^1$ is 10 inches. As the specific gravity of the water in $W^1$ is assumed to be .80, the head $W^1$ will be represented by 8.00. As the specific gravity of the head of water $W^2$ is 1.00, the head $W^2$ may be represented by 11. The head of heavy liquid $L^1$ may be represented as 11X. The equation may then be written—

$$11X = 8 + 11$$
$$X = 19/11 = 1.727 \text{ (specific gravity of the heavy liquid 215)}$$

In the form of invention illustrated in Fig. 5, if the indicating tube 212 should become broken while the boiler is operating under pressure, the water in both conduits 213 and 214 would begin to flow toward the indicating tube. This flow of water, however, would immediately be stopped by the operation of the check valves 213i and 214f. Should a leak occur while the boiler is not operating under pressure, either in conduit 213 or 214 the liquid 215 will rise in either the tube 212 or the conduit 213 until the difference in head between the two branches of the high specific gravity liquid is sufficient to cause the short branch and the column of water in the conduit unaffected by a leak to be balanced by the longer branch of the high specific gravity liquid. The sizes of the trap chambers and the tube 212 are such that the high specific gravity liquid will not pass completely out of the inner compartment of the lower trap chamber and up into the conduit 213, or in the reverse direction, this liquid will not pass up into the tube 212 and into the upper trap chamber to such an extent that the lower end of the liquid will pass completely out of the outer compartment of the lower trap chamber 210.

From the foregoing it is apparent that the liquid level indicator of the present invention may be readily adapted for indicating at a remote point the level of water in boilers or the level of other types of liquids in closed receptacles. The instrument board of the indicating device may be placed at any convenient point below the level of the liquid in the container to which the indicating device is attached. By a proper adjustment of the cooperating parts and the specific gravity of the balancing liquid in the indicating device, it is possible to register indications which are substantially identical with the indication given by an ordinary gauge glass attached to the boiler at the water level.

While the present description sets forth certain preferred embodiments of the invention, numerous changes may be made in the construction illustrated without departing from the spirit of the invention, and it is therefore desired that the present embodiments be considered in all respects as illustrative and not restrictive, reference being had to the appended claims rather than to the foregoing description to indicate the scope of the invention.

I claim:

1. A remote liquid level indicator of the type in which three superposed columns of nonmiscible liquids each differing in specific gravity are influenced by water contained in water conduits connected respectively to a boiler beyond points of normal maximum and minimum levels, said indicator comprising in combination, a transparent indicating tube containing superposed columns of colored water and oil, a pair of trap chamber casings spaced apart and connected respectively at the upper and lower ends of the indicating tube, said trap chamber casings being independent of each other whereby the central portion of the indicating tube is left in an unobstructed condition, the lower trap chamber containing a column of mercury beneath the water and oil columns, the upper trap chamber casing having a partition member therein dividing the chamber into two concentric compartments, the inner compartment communicating directly with the indicating tube, the partition separating the inner and outer compartments of said upper trap chamber having an opening therethrough in an upper portion thereof to provide communication between said compartments, and means removably disposed in said partition opening for restricting the same thereby to retard the free flow of liquid from one compartment to the other.

2. A remote liquid level indicator of the type in which three superposed columns of nonmiscible liquids each differing from the others in its specific gravity are influenced by water contained in water conduits connected respectively to a boiler beyond points of normal maximum and minimum levels, said indicator comprising in combination, a transparent indicating tube containing superposed columns of colored water and oil, a pair of trap chamber casings spaced apart and connected respectively at the upper and lower ends of the indicating tube, said trap chamber casings being independent of each other whereby the central portion of the indicating tube is left in an unobstructed condition, the lower trap chamber containing a column of mercury beneath the water and oil columns, the upper trap chamber casing having a partition member therein dividing the chamber into two vertically extending compartments, one compartment communicating directly with the indicating tube, there being an opening in the partition member between the compartments and located adjacent to the upper portions thereof, and means removably disposed in said partition opening for restricting the same thereby to retard the free flow of liquid from one compartment to the other.

3. In a liquid level indicator a trap chamber casing having an indicator glass, said trap chamber casing having vertically disposed inner and outer concentrically related chambers, the inner chamber being adapted for directed connection with the indicating glass, a body of light oil normally contained in the upper portion of both inner and outer chambers, a body of water contained in the lower portion of the outer chamber, the inner chamber being separated from the outer chamber by a wall having an opening therein, a closure element secured within said opening, there being a small space provided between the wall opening and the closure element whereby a restricted passage is provided between the two trap chambers when the closure is in place, the body of the oil within the upper portion of both trap chambers being positioned to prevent the water in the lower portion of the outer chamber from entering and passing through the said restricted passage.

4. In a liquid level indicator a trap chamber casing having an indicator glass, said trap chamber casing having vertically disposed inner and outer concentrically related chambers, the inner chamber being adapted for direct connection with the indicating glass, a body of light oil contained in the upper portion of both inner and outer chambers, a body of water contained in the lower portion of the outer chamber, the inner chamber being separated from the outer chamber by a wall having a threaded opening therein, a threaded closure element adapted to be secured within said opening, the threads of the closure element being loosely related to the threads of the opening whereby a restricted passage is provided between the two trap chambers, the body of the oil within the upper portion of both trap chambers being positioned normally to prevent the water in the lower portion of the outer chamber from entering and passing through the said restricted passage.

5. In a liquid level indicator a trap chamber casing having an indicator glass, said trap casing having vertically disposed inner and outer concentrically related chambers, the inner chamber being adapted for direct connection with the indicating glass, a body of light oil contained in the upper portion of both inner and outer chambers, a body of water contained in the lower portion of the outer chamber, the inner chamber being separated from the outer chamber by a wall having an opening therein, a closure element secured within said opening, there being a small space provided between the wall opening and the closure element whereby a restricted passage is provided between the two trap chambers when the closure is in place, the body of the oil within the upper portion of both trap chamber casings being positioned to prevent the water in the lower portion of the outer chamber from entering and passing through the said restricted passage, the trap chamber casing having an opening in an outer wall adjacent to the closure element for the wall of the inner chamber giving access to such closure element, and a second closure element for closing the opening in the outer wall.

6. In a liquid level indicator, a trap chamber casing, a partition in the casing separating it into primary and secondary chambers, there being a passage providing intercommunication between lower portions of said chambers, the primary chamber being arranged for connection with an indicating tube, the secondary chamber being arranged for connection with a water conduit adapted to cause head pressure in the conduit to be imposed on the trap chamber, said trap chamber casing being adapted to contain a body of heavy liquid extending into both the primary and secondary chambers and adapted to contain a body of lighter liquid, nonmiscible with the heavier liquid, disposed in the primary chamber, means for withdrawing a portion of the lighter liquid from the primary chamber, said means comprising a member in the primary chamber joined to a wall of the trap casing and extending a substantial distance above the normal level of the heavy liquid therein, said member being formed with a duct extending therethrough and to the exterior of the trap chamber casing, and means for closing said duct.

7. A liquid level indicator comprising, a vertically disposed trap chamber casing, a partition in the trap chamber casing separating it into primary and secondary chambers, there being a passage providing intercommunication between lower portions of said chambers, the primary chamber having an outlet at its upper end and being provided with means at the outlet for connection with an indicating tube, the secondary chamber being arranged for connection with a water conduit adapted to cause head pressure in the conduit to be imposed on the trap chambers, said trap chamber casing being adapted to contain a body of heavy liquid extending into both the primary and secondary chambers and adapted to contain a body of lighter liquid, nonmiscible with the heavier liquid, disposed in the primary chamber above the heavier liquid, a calibrating member for the primary chamber comprising a pin-like element secured within the primary chamber and having its upper end in close proximity with the outlet leading to the indicating tube connection, and a check valve element supported on the upper end of the pin-like element, said check valve element being floatable in the heavy liquid but not floatable in the lighter liquid whereby a rise in level of the heavy liquid will float the check valve element into position to close the outlet leading to the indicating tube connection and prevent the heavy liquid from flowing through such outlet.

8. A liquid level indicator comprising, a vertically disposed casing, a chamber formed in the casing, the casing being provided with an opening for connecting the chamber with an indicating tube, means for causing a head pressure to be imposed on the chamber, said chamber being adapted to contain a body of heavy liquid partially filling the chamber and adapted to contain a body of lighter liquid, nonmiscible with the heavier liquid, disposed in the chamber above the heavy liquid, means for withdrawing a portion of the lighter liquid from the chamber, said means comprising a pin-like element in the chamber joined to a wall of the casing and extending a substantial distance above the normal level of the heavy liquid in the chamber, said element being formed with a closable duct extending therethrough and through an opening formed in the wall of the casing, said duct being formed with a vertically extended bore terminating short of the upper end of the pin-like element and a connecting bore extending downwardly from the vertically extended bore to the exterior of the pin-like element, the duct opening on the exterior of the pin-like element being entirely below the point of connection of the downwardly extending duct and the vertically extending duct, whereby inflow of heavy liquid into the duct, in the event of a rise in level of the heavy liquid above the opening of the duct, will be prevented due to trapping of the lighter liquid in the duct.

9. A liquid level indicator comprising, a trap chamber casing, a partition in the trap chamber separating it into primary and secondary chambers, there being a passage providing intercommunication between lower portions of said chambers, the primary chamber being arranged for connection with an indicating tube, the secondary chamber being arranged for connection with a water conduit adapted to cause head pressure in the conduit to be imposed on the trap chambers, said trap chamber casing being adapted to contain a body of heavy liquid extending into both the primary and secondary chambers and adapted to contain a body of lighter liquid, nonmiscible with the heavier liquid, disposed in the primary chamber, means for withdrawing a portion of the lighter liquid from the primary chamber, said means comprising a pin-like element in the primary chamber functioning to properly proportion the volume of the primary chamber with that of the secondary chamber, said casing having an opening in its lower end, a plug arranged to be removably secured within said opening, means for securing said pin-like element to the inwardly directed portion of the plug, said pin-like element and plug being formed with registering ducts extending therethrough, and means on the outer portion of the plug for closing the duct therein.

10. A remote liquid level indicator of the type in which two superposed columns of nonmiscible liquids, each differing in specific gravity, are influenced by water contained in water conduits connected respectively above and below the points of normal maximum and minimum levels, said indicator comprising, in combination, a transparent indicating tube, a vertically disposed trap chamber casing having primary and secondary chambers communicating with each other at their lower ends, the indicating tube being directly connected to the upper end of the primary chamber, a water conduit connected to the upper end of the secondary chamber, said water conduit extending vertically above the point of maximum indication to be given by the indicating tube, a body of high specific gravity liquid partially filling the primary and secondary chambers, said water conduit being provided with a controllable opening at the level of maximum indication of the indicating tube, whereby, after said conduit has been filled, with liquid to be measured, up to the opening in said conduit, the desired amount of indicating fluid, having the same specific gravity as the liquid to be measured, may be introduced into the indicating tube and primary chamber due to the outflow of liquid to be measured through the conduit opening, such amount of indicating fluid being indicated as sufficient when the level of the fluid reaches the point of maximum indication, an indicating fluid in the said indicating tube and floating in the upper portion of said primary chamber upon said high specific gravity liquid, and means for bleeding out from said primary chamber, without disturbing said high specific gravity liquid, any excess quantity of the indicating fluid for the purpose described.

11. In a device of the character described, an upper hollow trap member, means separating the interior of said upper trap member into inner and outer communicating chambers, said upper trap member having a top opening to the outer chamber and removable means closing the opening, said upper trap separating means having a top opening substantially in axial alignment with the top opening on the upper trap member, said upper trap member inner chamber also having a bottom opening substantially in axial alignment with its top opening, a lower hollow trap member disposed at a relatively fixed distance from the upper trap member, means separating the lower trap member into inner and outer communicating chambers, said lower trap member having a top opening to its inner chamber and in axial alignment with the said bottom opening in the upper trap member, and a tubular sight glass extending between said upper and lower trap members and through its respective ends establishing communication between the inner chambers of the upper and lower trap members respectively through the bottom and top openings thereof, said sight glass being insertable and removable through the top openings of said upper trap member and the said separating means in the upper trap member.

12. In a device of the character described, an upper hollow trap member, means separating the interior of said upper trap member into inner and outer communicating chambers, said upper trap member having a top opening to the outer chamber and removable means closing the opening, said upper trap separating means having a top opening substantially in axial alignment with the top opening in the upper trap member, said upper trap member inner chamber also having a bottom opening substantially in axial alignment with its top opening, a lower hollow trap member disposed at a relatively fixed distance from the upper trap member, means separating the lower trap member into inner and outer chambers communicating with one another at their lower ends, said lower trap member having a top opening to its inner chamber and in axial alignment with the said bottom opening in the upper trap member, a tubular sight glass extending between said upper and lower trap members and through its respective ends establishing communication between the inner chambers of the upper and lower trap members respectively through the bottom and top openings thereof, said sight glass being insertable and removable through the top openings of said upper trap member and the said separating means in the upper trap member, said lower trap member having a bottom opening leading to said lower trap member inner chamber, a displacement member removably disposed in said bottom opening of the lower trap member, and a valve normally supported on said displacement member and adapted to float upwardly, upon liquid rising in said inner chamber of the lower trap member, to close the top opening in said lower trap member thereby to stop the rise of said liquid.

13. In a device of the character described, an upper hollow trap member, means separating the interior of said upper trap member into inner and outer communicating chambers, said upper trap member having a top opening to the outer chamber and removable means closing the opening, said upper trap separating means having a top opening substantially in axial alignment with the top opening in the upper trap member and a removable closure member restricting flow between said inner and outer chambers through said separating means, said upper trap member inner chamber also having a bottom opening substantially in axial alignment with its top opening, a lower hollow trap member disposed at a relatively fixed distance from the upper trap member, means separating the lower trap member into inner and outer communicating chambers, said lower trap member having a top opening to its inner chamber and in axial alignment with the said bottom opening in the upper trap member, and a tubular sight glass extending between said upper and lower trap members and through its respective ends establishing communication between the inner chambers of the upper and lower trap members respectively through the bottom and top openings thereof, said sight glass being insertable and removable through the top openings of said upper trap member and the said separating means in the upper trap member.

14. In a device of the character described, an upper hollow trap member, means separating the interior of said upper trap member into inner and outer communicating chambers, said upper trap member having a top opening to the outer chamber and removable means closing the opening, said upper trap separating means having a top opening substantially in axial alignment with the top opening in the upper trap member and a removable closure member restricting flow between said inner and outer chambers through said separating means, said upper trap member inner chamber also having a bottom opening substantially in axial alignment with its top opening, a lower hollow trap member disposed at a relatively fixed distance from the upper trap member, means separating the lower trap member into inner and outer chambers communicating with each other at their lower portions, said lower trap member having a top opening to said inner chamber and in axial alignment with the said bottom opening in the upper trap member, a tubular sight glass extending between said upper and lower trap members and through its respective ends establishing communication between the inner chambers of the upper and lower trap members, said sight glass being insertable and removable through the top openings of said upper trap member and the said separating means in the upper trap member, a liquid displacement member removably disposed in the inner chamber of said lower trap member, and a valve, adapted to float upon a liquid, freely supported by said displacement member whereby upon a predetermined rise of liquid in the inner chamber of the lower trap member the valve will float off of its support and close the top opening in the lower trap member.

15. In a device of the character described, an upper trap member having aligned top and bottom openings, a tubular partition in said upper tray member and substantially concentrically disposed about said bottom opening, the top of said partition being spaced from the top of the upper trap member, removable means having a restricted aperture therethrough providing a closure for the top of said partition, a lower trap member having a top opening aligned with the bottom opening of the upper trap member, a sight glass extending between said trap members and into the bottom opening of the upper member at one of its ends and into the top opening of said lower member at the other of its ends, said upper and lower members being disposed in substantially fixed positions relative to one another, said sight glass being insertable and removable through the top opening in the upper member, means for sealing the junctures between said sight glass and upper and lower traps, and removable means normally closing the top opening in the upper member.

16. In a device of the character described, an upper trap member having aligned top and bottom openings, a lower trap member having a top opening aligned with the bottom opening of the upper trap member, a substantially cylindrical partition in said upper trap member dividing the trap into two chambers one of which substantially surrounds the other, said partition having a top opening providing a passage therethrough for the flow of fluid from one chamber to the other and said partition top opening being aligned with said openings in said upper trap member, removable means for restricting the free flow of fluid from one of said chambers to the other through said passage, a sight glass extending between said trap members and into the bottom opening of the upper member at one of its ends and into the top opening of said lower member at the other of its ends, said upper and lower members being disposed in substantially fixed positions relative to one another, said sight glass being insertable and removable through the top opening in the upper member, means for sealing the junctures between said sight glass and upper and lower traps, and removable means normally closing the top opening in the upper member.

17. In a remote liquid level indicator, an indicating tube, a trap chamber casing connecting to the lower end thereof, leaving a substantial portion of the tube unobstructed, a partition member in said casing dividing it into primary and secondary chambers, intercommunicating at their lower ends, the indicating tube being connected to the primary chamber, a water conduit adapted to extend from a receptacle to be measured and connected to the trap chamber casing and communicating with the secondary chamber, a body of water in said conduit extending partially into the secondary chamber, a body of mercury below the body of water, said mercury occupying the remainder of the secondary chamber and a portion of the primary chamber to a place above the normal level of intercommunication between said chambers, a body of liquid nonmiscible with mercury located within the indicating tube and the remainder of the primary chamber and floating upon the mercury therein, the opening from the primary chamber into the indicating tube providing a valve seat, a valve element capable of floating on mercury but not in the liquid thereabove, means for supporting the valve element independently of the mercury and in juxtaposition to the opening into the indicating tube whereby, in the event of breakage of the indicating tube with a consequent rise in the level of mercury within the primary compartment due to the pressure of liquid in the conduit connected with the secondary chamber, the valve element will be lifted by the mercury and brought into position closing said opening and preventing flow of mercury out of the primary chamber, said valve supporting means having a passage therethrough for establishing communication between the primary chamber above the maximum normal level of the mercury therein and the exterior of said trap casing, and means normally closing said passage.

18. A liquid level indicator comprising, a trap chamber casing, a partition in the trap chamber separating it into primary and secondary chambers, there being a passage providing intercommunication between lower portions of said chambers, the primary chamber being arranged for connection with an indicating tube, the secondary chamber being arranged for connection with a water conduit adapted to cause head pressure in the conduit to be imposed on the trap chambers, said trap chamber casing being adapted to contain a body of heavy liquid extending into both the primary and secondary chambers and adapted to contain a body of lighter liquid, nonmiscible with the heavier liquid, disposed in the primary chamber, said casing having an opening in its lower end, means for withdrawing a portion of the lighter liquid from the primary chamber, said means comprising a pin-like element disposed in the primary chamber functioning properly to proportion the volume of the primary chamber with that of the secondary chamber, said element being removable through said opening, means for securing said pin-like element to the casing, said pin-like element being formed with a duct extending therethrough, and means for closing the duct.

19. A remote liquid level indicator of the type in which two superposed columns of nonmiscible liquids, each differing from the other in its specific gravity, are influenced by water contained in water conduits connected respectively above and below the points of normal maximum and minimum levels, said indicator comprising, in combination, a transparent indicating tube, a vertically disposed trap chamber casing having primary and secondary chambers communicating with each other at their lower ends, the indicating tube being directly connected to the upper end of the primary chamber, a water conduit connected to the upper end of the secondary chamber, said water conduit extending vertically above the point of maximum indication to be given by the indicating tube, a body of high specific gravity liquid partially filling the primary and secondary chambers, an indicating fluid in the said indicating tube and floating in the upper portion of said primary chamber upon said high specific gravity liquid, and means for bleeding out from said primary chamber, without disturbing said high specific gravity liquid, any excess quantity of the indicating fluid for the purpose described.

20. An article of manufacture for use in a liquid level indicator of the character described having a trap chamber casing adapted to contain a body of heavy liquid and adapted to contain a body of lighter liquid, nonmiscible with the heavier liquid, disposed above the heavy liquid, means for withdrawing a portion of the lighter liquid from above the heavy liquid and without disturbing the latter comprising, a pin-like element adapted to project into the casing to a place above the normal level of the heavy liquid, means for securing said pin-like element to the casing, said pin-like element having a duct extending therethrough from a place above the normal level of the heavy liquid to the exterior of the casing, and means for closing the duct.

21. An article of manufacture for use in a liquid level indicator of the character described having a trap chamber casing adapted to contain a body of heavy liquid and adapted to contain a body of lighter liquid, nonmiscible with the heavier liquid, disposed above the heavy liquid, means for withdrawing a portion of the lighter liquid from above the heavy liquid and without disturbing the latter comprising, a pin-like element of a length sufficient to extend into said casing through a pre-formed opening in the casing and to a place above the normal level of the heavy liquid, said element having a duct therethrough extending from a place above the normal level of the heavy liquid to a place exterior of the casing, said duct being so formed as to have a rising portion whereby to trap some of the lighter liquid between its ends and above the heavier liquid tending to flow out of said duct.

FREDERIC McNEILL.